Nov. 22, 1932.  H. F. OMER ET AL  1,888,884
DRIVE AXLE GEARING
Filed Nov. 12, 1931   3 Sheets-Sheet 1

Harry F. Omer and
Marion R. Williams
INVENTORS
BY Victor J. Evans & Co.
ATTORNEY Nov. 22, 1932.   H. F. OMER ET AL   1,888,884
DRIVE AXLE GEARING
Filed Nov. 12, 1931   3 Sheets-Sheet 3

Harry F. Omer and
Marion R. Williams
INVENTORS

BY Victor J. Evans & Co.
ATTORNEY

Patented Nov. 22, 1932

1,888,884

UNITED STATES PATENT OFFICE

HARRY F. OMER, OF KANSAS CITY, KANSAS, AND MARION R. WILLIAMS, OF KANSAS CITY, MISSOURI

DRIVE AXLE GEARING

Application filed November 12, 1931. Serial No. 574,608.

The object of the invention is to provide a gearing for incorporation as a part of the drive axle of a motor vehicle, whether it be of the pleasure car type, a tractor, truck or other form so that equal distribution of the power of the two axle parts will always be had, thus making it possible, where one wheel may be mired, for the other wheel to exert the necessary tractive effort to move the vehicle; to provide a drive axle gearing which will not be subject to the disadvantages of the present differential gearing where one wheel may be slightly smaller than the other due to a worn tire being on that wheel with the resultant effect of causing undue wear to the better tire; to provide a drive axle gearing which may have all the advantages resulting from free wheeling; and to provide a gearing of this nature which is of comparatively simple form and susceptible of inclusion in the present vehicular apparatus without material modification thereof.

Figure 1:
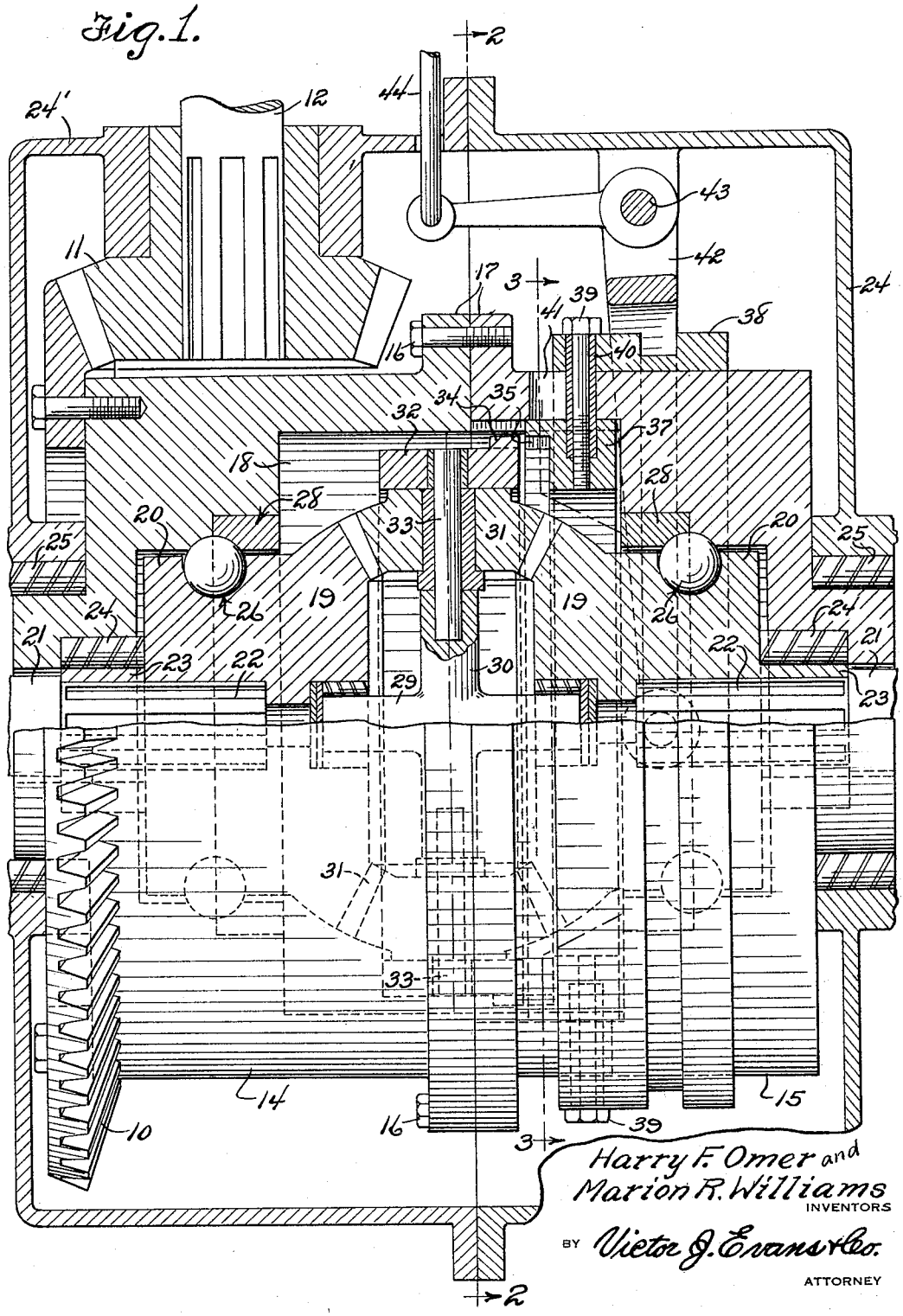

With this object in view the invention consists in a construction and combination of parts of which a preferred embodiment is illustrated in the accompanying drawings wherein:

Figure 1 is a view partly in section and partly in elevation of the central part of a drive axle and its housing showing the invention incorporated.

Figure 2:
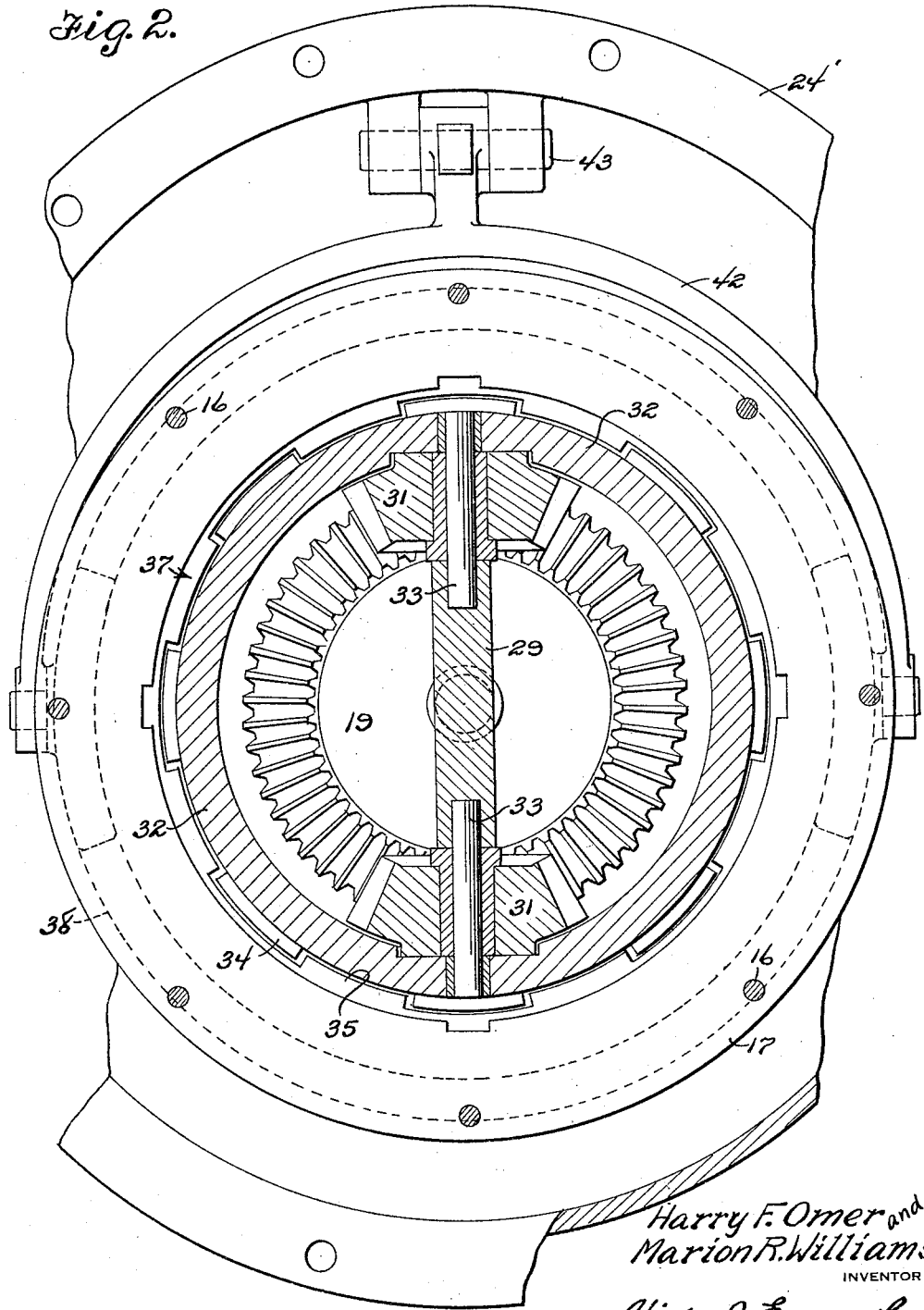
Figure 3:
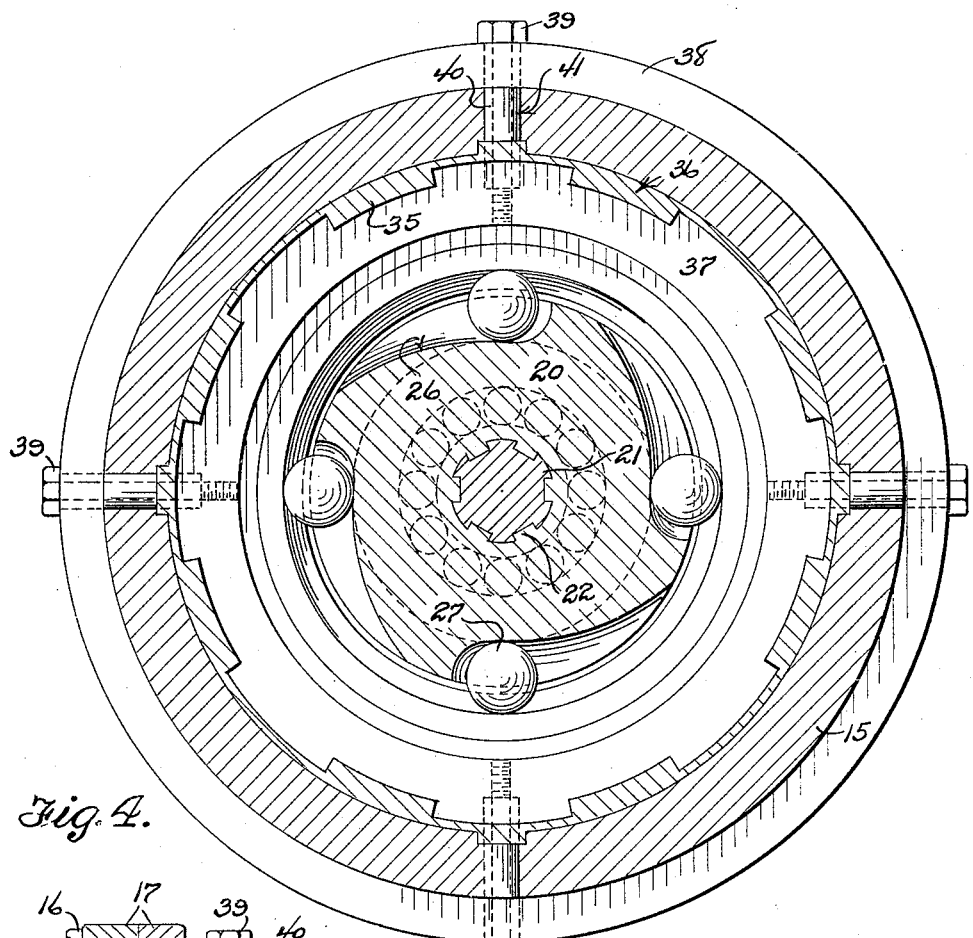

Figures 2 and 3 are sectional views on the planes indicated by the line 2—2 and 3—3, respectively, of Figure 1.

Figure 4:
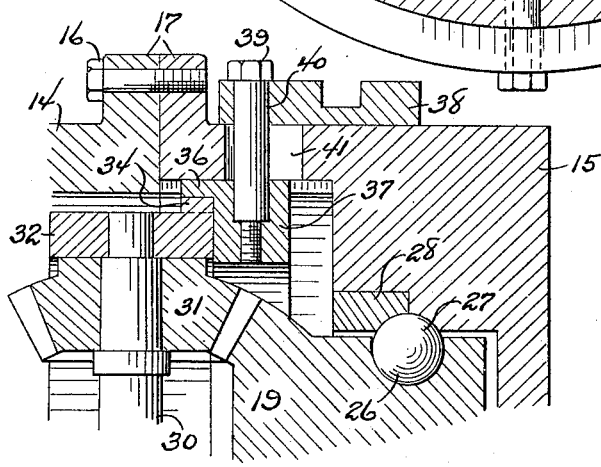

Figure 4 is a detail sectional view of a portion of the structure of Figure 1 but showing the clutch ring in engaged position to lock the spider against rotation with reference to the differential housing.

In carrying out the invention the conventional practice with reference to differential gearing is modified to the extent of having the ring gear 10 which is driven in the customary manner by the bevel pinion 11 mounted on the rear end of the propeller shaft 12, bolted to a housing member comprising the blocks 14 and 15 secured together by cap screws 16 passing through complemental flanges 17.

The blocks are hollowed out on their facing sides to provide a chamber 18 in which is housed a differential gearing of which the gears 19 are formed with hubs 20 mounted on the axle parts 21. The axle parts are formed each with a circular series of keys 22 serving with means to positively lock the gear hubs to these parts. These keys 22 also supporting the inner rings 23 of anti-friction bearing 24, on which the housing or drum composed of the blocks 14 and 15 rotate. The blocks 14 and 15 are each formed with a hub portion between which and bearings formed in the housings 24 are interposed anti-friction bearings 25.

The blocks 14 and 15 are counter-bored from the clearance space 18 to provide pockets for the hubs 20 and the latter are formed with circumferentially extending grooves 26 progressively reduced in width radially of the hub, these grooves holding balls 27, constituting the clutch elements of an overrunning clutch. The pockets formed in the blocks are circumferentially grooved to receive the balls 27, these grooves being closed on the one side by a removable ring 28 so that the hubs may be inserted in the pockets with the balls in place. Any tendency of the block 15 to exceed the angular speed of the hub 20 turing in a left hand direction as in Figure 3 will result in the balls rolling toward the shallow parts of the slots 26 and thus effect a clutching or binding action between the gear hub and the block.

Journaled in the facing sides of the two gears 19 is a jack shaft 29 formed as an integral part of the spider 30 on the arms of which are rotatably mounted the pinions 31 which mesh with the gears 19. A ring 32 surrounds the arms of the spider and is retained in place by pins 33 passing radially through and axially into the spider arm. The ring thus acts as a retainer ring for the spider gear.

On its outer periphery, the ring is formed with a series of uniformly spaced teeth 34 which are engageable in intercurrent relation with the teeth 35 formed in the inner periphery of a flange 36 which constitutes a lateral extension of the clutch ring 37, the latter being mounted in the clearance space 18 of the block 15 for lateral movement to engage the teeth 35 with the teeth 34 or to disengage the two sets of teeth. The movement of the clutch ring 37 is effected through the instrumentality of a shifter ring 38 mounted exteriorly to the block 15 but operatively connected with the clutch ring 37 by means of cap screws 39 which pass through it and thread into the clutch ring and through tubular spacers 40 interposed between the clutch ring and shifter ring. The tubular spacers travel in slots 41 formed through the wall of the block 15.

The shifter ring 38 is actuated by means of a conventional shifter 42 pivoted, as at 43, and actuated by means of a link 44 connected with a suitable hand or foot actuated device.

Movement of the shifter in one direction results in sliding the shifter ring 38 along the block 15 and thus engaging the teeth 35 and 34 when the spider ring will become locked to the housing composed of the blocks 14 and 15 and thus will be driven in synchronism with the ring gear 10. The mechanism will thus function as a true differential, permitting one axle part and its attendant wheel to exceed the other in making a turn and this because the overrunning clutch comprising the balls 27 will drop into the low position for the fast running wheel and axle part, while the clutch on the other axle part will remain in engaged position. Further, should a machine equipped with the gearing have one of the drive wheels mired, the other will have full tractive effect by reason of its overrunning clutch of its associated axle part locking that part to the housing.

With the shifter ring moved to disengage the teeth 35 and 34, the spider will then be free floating and the two axle parts may exceed the speed of the housing composed of the blocks 14 and 15, the overrunning clutches functioning to clutch the two axle parts to the housing when they fall or drop to the speed of the housing.

While the invention has been shown and described in a specific embodiment it is not to be restricted to such. The right is reserved to make such changes or alterations as reduction to practice may dictate without departing from the spirit of the invention as defined by the appended claims.

Having described the invention, what is claimed as new and useful is:

1. A drive axle gearing comprising a two-part axle, a member in surrounding relation to the adjacent ends of said axle parts, a driving element operatively connected with said member, a differential gearing operatively connecting the axle parts and housed by said member, overrunning clutches interposed between the axle parts and said member, the differential gearing comprising a gear connected with each axle part and a set of spider gears in mesh with the axle gears, the spider gears being mounted on a spider, and means for selectively locking the spider to said member or releasing it therefrom.

2. A drive axle gearing comprising a two-part axle, a member disposed in surrounding relation to the adjacent ends of said axle parts, a driving element operatively connected with said member, beveled gears enclosed by said member and mounted one each on one of the axle parts, overrunning clutches interposed between the beveled gears and axle parts, a spider having a jack shaft journaled in the facing sides of said gears and carrying beveled pinions meshing with the same, a ring in surrounding relation to and carried by the spider, and a clutch engageable with and releasable from said ring to lock the spider with reference to said member or to permit it to float independently.

3. A drive axle gearing comprising a two-part axle, a member in surrounding relation to the adjacent ends of said axle parts, a driving element operatively connected with said member, overrunning clutches mounted one each on each of the axle parts and interposed between the latter and said members and a differential gearing operatively connecting the axle parts and comprising spider gears and means for locking the spider gears against bodily rotation with reference to said member or releasing them to permit relative bodily rotation.

4. A drive axle gearing comprising a two-part axle, a member in surrounding relation to the adjacent ends of said axle parts, a driving element operatively connected with said member, and beveled gears enclosed by said member and mounted one on each of the axle parts, overrunning clutches interposed between the beveled gears and the axle parts, a spider having a jack shaft journaled in the facing sides of said gears and beveled pinions mounted on its radial arms and in mesh with said gear, a ring in surrounding relation to and carried by the spider and formed with a peripheral series of spaced teeth, and a shifter ring carried by said member and locked against angular movement with respect thereto, said shifting ring being provided with teeth for engagement in intercurrent relation with the teeth on the spider ring.

5. A drive axle gearing comprising a two-part axle, a member disposed in surrounding relation to the adjacent ends of said axle parts, a driving element operatively connected with said member, beveled gears enclosed by said member or mounted one each on each of the axle parts, a spider having a jack shaft journaled in the facing sides of said gears and being provided with beveled pinions in mesh with said gears, overrunning clutches interposed between the hubs of said gears and said member, and means for selectively locking said spider with relation to said member or permitting it to float with respect to the latter.

6. A drive axle gearing comprising a two-part axle, a driving element, a member disposed in surrounding relation to the adjacent ends of said axle parts and operatively connected with said driving element, a differential gearing housed by said member and having beveled gears carried one each by each of the axle parts and spider gears meshing with the beveled gears and carried by a mounting member, overrunning clutches interposed between the beveled gears and the axle parts, and means for operatively connecting the spider gear mounting with or disengaging it from said member.

7. A drive axle gearing comprising a two-part axle, a driving element, a member disposed in surrounding relation to the adjacent ends of said axle parts and operatively connected with said driving element, a differential gearing housing by said member and comprising beveled gears mounted one each on each of the axle parts and spider gears and a mounting for the same, the spider gears meshing with the beveled gears, overrunning clutches interposed between the beveled gears and the axle parts, and a manually actuable clutch for operatively connecting the spider gear mounting with said member or disengaging it therefrom to permit it to float in said member.

In testimony whereof we affix our signatures.

HARRY F. OMER.
MARION R. WILLIAMS.